United States Patent
Greminger

(10) Patent No.: US 8,481,613 B2
(45) Date of Patent: Jul. 9, 2013

(54) SOLVENT TRANSFER PROCESS FOR ORGANIC POLYMERS

(75) Inventor: Douglas C. Greminger, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 343 days.

(21) Appl. No.: 13/055,796

(22) PCT Filed: Aug. 3, 2009

(86) PCT No.: PCT/US2009/052573
§ 371 (c)(1),
(2), (4) Date: Jan. 25, 2011

(87) PCT Pub. No.: WO2010/017134
PCT Pub. Date: Feb. 11, 2010

(65) Prior Publication Data
US 2011/0124774 A1    May 26, 2011

Related U.S. Application Data

(60) Provisional application No. 61/086,217, filed on Aug. 5, 2008.

(51) Int. Cl.
*C08J 3/00* (2006.01)

(52) U.S. Cl.
USPC ......... 523/328; 523/332; 523/343; 525/332.2

(58) Field of Classification Search
USPC ................. 523/328, 332, 343; 525/333.2
See application file for complete search history.

(56) References Cited

U.S. PATENT DOCUMENTS

| | | |
|---|---|---|
| 4,476,287 A | 10/1984 | Maehara |
| 2008/0287559 A1 | 11/2008 | King et al. |
| 2009/0008236 A1 | 1/2009 | Leng et al. |
| 2010/0004402 A1 | 1/2010 | King et al. |

FOREIGN PATENT DOCUMENTS

| | | |
|---|---|---|
| DE | 137308 A | 8/1979 |
| GB | 460114 B | 7/1935 |
| WO | 2007058736 A | 5/2007 |
| WO | 2008021417 A | 2/2008 |

*Primary Examiner* — Edward Cain
(74) *Attorney, Agent, or Firm* — Gary C Cohn PLLC

(57) ABSTRACT

An organic polymer is transferred from one solvent to another. In a first step, a solution of the polymer in a first solvent is divided into droplets, dispersed into a liquid phase such as water bath, and the first solvent is removed from the droplets to produce a slurry in the liquid phase. Then, the second solvent is contacted with the slurry to dissolve the organic polymer and produce a second solution. The second solution is removed from the liquid phase. The process is especially suitable for transferring a butadiene polymer from a hydrocarbon solvent into a halogenated solvent for bromination.

6 Claims, 2 Drawing Sheets

SOLVENT TRANSFER PROCESS FOR ORGANIC POLYMERS

This application claims priority from U.S. Provisional Application No. 61/086,217 filed 5 Aug. 2008.

The present invention relates to a solvent transfer process whereby an organic polymer is recovered from one solvent and redissolved into a second solvent.

There are occasional circumstances in which it is necessary to recover an organic polymer from a solution, and then to redissolve it into a second solvent. This often involves cases in which the organic polymer is produced in a solution polymerization process, and then undergoes some downstream reaction. In some cases, it is necessary to use different solvents in the two operations.

An example of such a case is the polymerization of a butadiene polymer or copolymer and its subsequent bromination. The polymerization is usually performed in a hydrocarbon solvent, whereas the bromination reaction is preferably done in a halogenated solvent. The halogenated solvent cannot be used in the polymerization step, because the halogens can interfere with the polymerization catalyst. The hydrocarbon solvent is not the solvent of choice for the bromination reaction, because the brominated polymer has poor solubility in hydrocarbon solvents. For handling purposes, it is preferred to keep the brominated polymer in solution until a specific recovery step is conducted. Therefore, the butadiene polymer must be transferred from the hydrocarbon solvent that was used in the polymerization step into a halogenated solvent for use in the bromination reaction.

In cases such as these, it is desired from an economic standpoint to make the transfer as efficiently as possible. Therefore, the transfer should be performed quickly and with a minimum of energy expenditure and capital investment. In addition, it is usually necessary to prevent cross-contamination of the two solvents.

One way of doing the solvent transfer is to disperse the starting solution into hot water. This volatilizes the first solvent and forms particles of the polymer. The polymer particles are stripped to remove residual solvent, dried and then redissolved in the second solvent. This approach has the disadvantages of high energy costs, and of potentially degrading the polymer during the stripping and/or drying steps. In addition, this approach is not very useful when the polymer has a low glass transition temperature. In that case, the polymer particles tend to be soft and sticky, agglomerating during drying and adhering to the processing equipment.

Another approach is to combine the starting solution with a less volatile second solvent, and then distilling the mixture. If the second solvent is sufficiently less volatile than the first solvent, the first solvent can be selectively volatilized off, leaving the polymer dissolved in the second solvent. This approach has similar drawbacks, especially the need for large amounts of energy to volatilize the solvent. In addition, the volatilized first solvent is often contaminated with the second solvent, and must be discarded or subjected to further purification if it is to be recycled.

In a variation of the second approach, the transfer is done in two steps, using an intermediate solvent. The intermediate solvent is added to the starting solution as before, and the first solvent is volatilized off to leave a solution of the polymer in the intermediate solvent. Then, the second solvent is added to the new solution, and the intermediate solvent is volatilized off. A solution of the polymer in the second solvent is obtained. This method requires sufficient volatility differences between the first solvent and the intermediate solvent and then between the intermediate solvent and the second solvent. Finding such an intermediate solvent is difficult and this approach is even more energy-intensive than the other approaches.

Therefore, an efficient method for performing the solvent transfer of an organic polymer is desired, especially when the organic polymer has a glass transition temperature of about 15° C. or lower.

The present invention is in one aspect a process for transferring an organic polymer from a first solvent to a second solvent, comprising (1) forming droplets of a first solution of the organic polymer in a first solvent, (2) thermally stripping the first solvent from the droplets to form particles of the organic polymer, (3) before, during or after step (2), immersing said droplets or particles in a nonsolvent liquid to form a slurry of the organic polymer in the nonsolvent liquid, (4) after steps (2) and (3), contacting the slurry with the second solvent and dissolving the organic polymer in the second solvent to form a second solution, and (5) separating the second solution from the nonsolvent liquid.

In preferred processes, the nonsolvent liquid is an aqueous phase. In other preferred processes, step (2) is conducted by contacting the droplets with steam.

This process is a cost-effective, efficient method for effecting a solvent transfer. In addition, the process allows the polymer to experience at most moderately elevated temperatures, and the residence time at those elevated temperatures is often quite short. This allows one to minimize the amount of thermal degradation that the polymer undergoes during the process.

The process is well adapted for continuous operation. Even when operated continuously, contamination of the first solvent with the second solvent is easily avoided simply by transferring the slurry to different equipment after the first solvent is removed from it but before the slurry is contacted with the second solvent. In this way, the main portion of the first solvent is never in contact with the second solvent and thus does not become contaminated. If it is necessary to prevent contamination of the second solvent with the first solvent, the slurry can be thermally stripped to volatilize trace quantities of the first solvent that may remain in it, before the slurry is contacted with the second solvent. In some processes, some level of contamination of the second solvent may be acceptable. In those cases, it is not necessary to stringently remove all traces of the first solvent from the slurry before it is brought into contact with the second solvent.

In certain embodiments, the process of the invention is part of a larger process for brominating a butadiene polymer. The larger process comprises:

(a) forming droplets of a first solution of the butadiene polymer in a hydrocarbon solvent, (b) thermally stripping at least 95% of the hydrocarbon solvent from the droplets to form particles of the butadiene polymer and a hydrocarbon solvent stream, (c) before, during or after step (b), immersing said droplets or particles in a continuous aqueous liquid phase to form a slurry of the butadiene polymer in the continuous aqueous liquid phase;

(d) contacting said butadiene polymer slurry with a halogenated solvent to dissolve the butadiene polymer into the halogenated solvent and produce a second butadiene polymer solution;

(e) separating said second butadiene polymer solution from the aqueous liquid phase;

(f) contacting the second butadiene polymer solution with a brominating agent to produce a brominated butadiene polymer;

(g) recovering the brominated butadiene polymer from said halogenated solvent; and (h) recycling at least a portion of the halogenated solvent recovered in step (g) into step (d).

Figure 1:
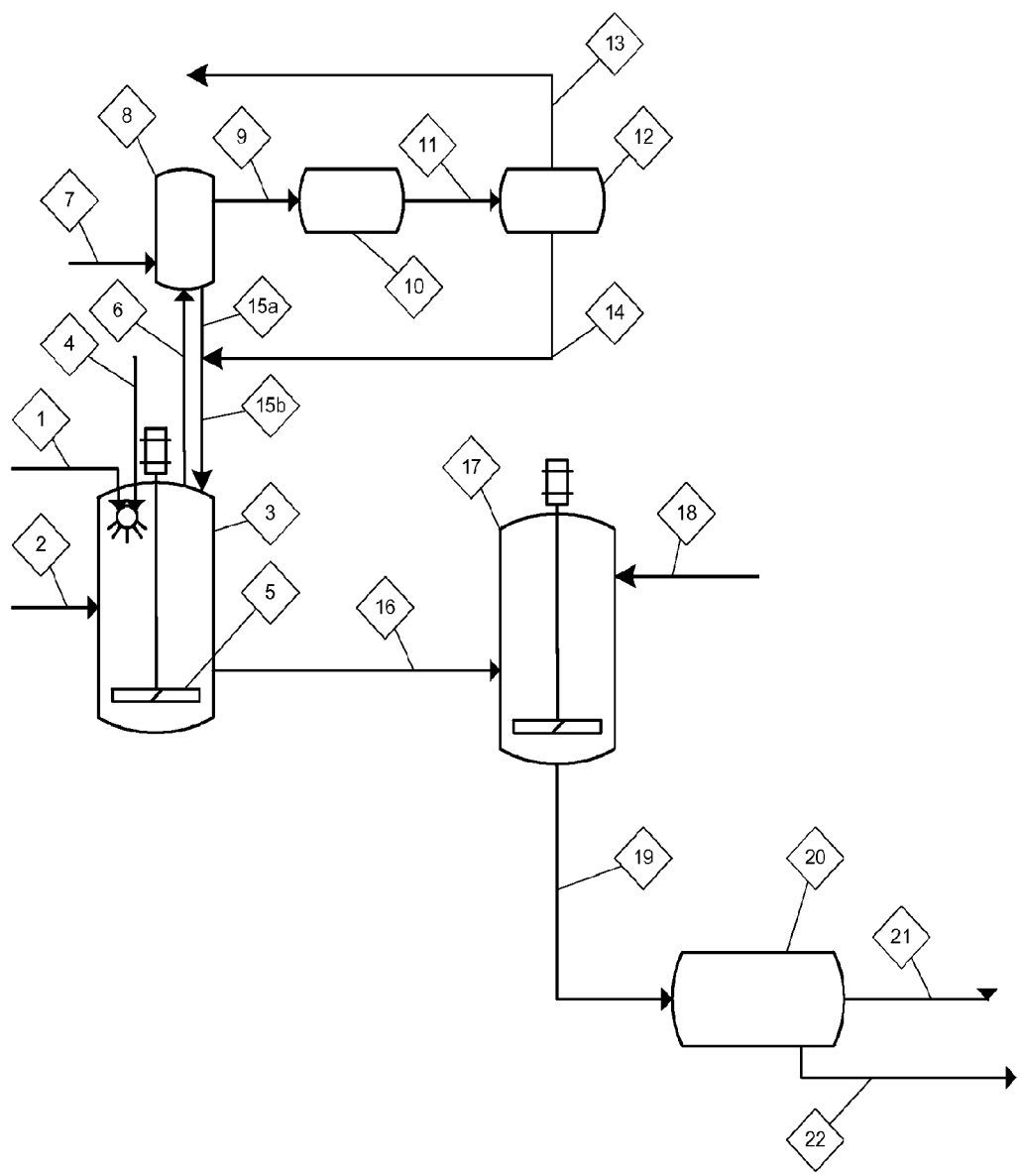
FIG. 1 is a schematic diagram illustrating an embodiment of the invention.

The present process starts with a solution of an organic polymer in a first solvent. The organic polymer can be any polymer which is soluble, under the operating conditions, in each of the first solvent and the second solvent, to the extent of at least 1 part, preferably at least 20 parts and more preferably at least 50 parts per 100 parts by weight of the solvent in each case. The organic polymer is preferably substantially insoluble in the nonsolvent liquid, i.e., is soluble therein to the extent of no more than 5 parts, preferably no more than 1 part, per 100 parts of the nonsolvent liquid. In addition, the organic polymer should not be reactive with the first solvent, second solvent, or nonsolvent liquid under the conditions of the solvent exchange process.

The organic polymer may be, for example, a polyolefin polymer or copolymer of various types, including various types of polyethylene polymers and copolymers and various types of polypropylene polymers and copolymers. The organic polymer may be a polymer or copolymer of a vinyl aromatic monomer such as styrene. The organic polymer may be a polyester, a polyamide, a polyurethane, a polyether, a polycarbonate or a polyurea. Polymers and copolymers of various acrylate and methacrylate monomers can be used.

The organic polymer may be a synthetic rubber material that has a glass transition temperature of 15° C. or below, preferably −20° C. or below. Synthetic rubbers include, for example, various types of polyethers and polymers of conjugated dienes, especially polymers and copolymers of butadiene. A preferred organic polymer for use in this invention is a butadiene homopolymer or a copolymer of butadiene such as a butadiene/styrene block copolymer.

The starting solution of the organic polymer may be a crude reaction solution from a solution polymerization reaction, which contains the organic polymer, the solvent in which the polymer is polymerized, and possibly reaction by-products of various types, the nature of which will depend on the particular polymerization process. The crude reaction solution may contain other materials as well, including unreacted starting materials and/or other components which may be present for various reasons.

The first solvent is of course a solvent for the organic polymer, and so is selected with the particular organic polymer in mind. In addition, the first solvent should be more volatile than the nonsolvent liquid. The first solvent preferably is substantially immiscible with the nonsolvent liquid, i.e., under the operating conditions, the first solvent and the nonsolvent liquid preferably are soluble in each other to the extent of no more than about 5 parts, preferably no more than about 2 parts, of one per 100 parts of the other. Preferred solvents have boiling temperatures (at atmospheric pressure) of less than 100° C. (especially less than 80° C.) and are substantially immiscible in water.

Materials that can be used as the first solvent, depending on the particular organic polymer, include ethers such as tetrahydrofuran; halogenated alkanes such as carbon tetrachloride, chloroform, dichloromethane and 1,2-dichloroethane; aliphatic hydrocarbons such as hexane, octane, decane, cyclohexane, cyclooctane, isooctane, isohexane, and the like, aromatic hydrocarbons such as benzene, naphthalene and toluene, and halogenated aromatic compounds such as bromobenzene, chlorobenzene and dichlorobenzene.

One crude reaction solution of particular interest is a solution of a block copolymer of butadiene and at least one vinyl aromatic monomer, especially a styrene/butadiene block copolymer, in a non-halogenated and non-oxygenated hydrocarbon solvent.

The starting solution is formed into droplets, heated to drive off the first solvent and dispersed into a nonsolvent liquid to form a slurry. These steps can be performed in a number of different ways. In some cases, two or more of these steps can be performed simultaneously. In certain embodiments, the droplets are formed by dispersing the reaction solution directly into a nonsolvent liquid. In other embodiments, the droplets are first formed and then transferred (before or after removing the first solvent) into a nonsolvent liquid.

The nonsolvent liquid is one in which the organic polymer is not reactive under the conditions of the solvent transfer process, and one in which the organic polymer has a solubility of no more than about 5 parts, preferably no more than about 2 parts, of one per 100 parts of the nonsolvent liquid under the operating conditions. The nonsolvent liquid should be less volatile than the first solvent and preferably is immiscible (as defined above) with both the first solvent and the second solvent. The nonsolvent liquid can be more or less volatile than the second solvent. The nonsolvent liquid preferably is water or an aqueous liquid that contains mainly water.

In some embodiments, the starting solution is dispersed directly into a nonsolvent liquid to form droplets. The nonsolvent liquid forms a continuous phase and the starting solution forms the disperse phase. This is conveniently done by bringing the starting solution and the nonsolvent liquid together and imparting shear to the mixture. A wide variety of apparatus can be used, the selection of which is generally not considered to be critical to the invention. A stirred vessel is suitable, provided that sufficient agitation is provided to shear the starting solution into droplets. Alternatively, the crude reaction mixture can be in the form of droplets and the droplets fed into the nonsolvent liquid, in which case the fluid medium should be agitated in order to minimize coalescence of the droplets. The agitation may serve to re-size the droplets into smaller droplets if desired. A single-fluid or two-fluid nozzle is a suitable device for introducing droplets of the crude reaction mixture into a nonsolvent liquid.

Another way of forming the droplets of the starting solution is to form the solution into droplets which are dispersed into a gaseous medium. This method is particularly amenable to continuous processes. The droplets thus formed are then immersed in the nonsolvent liquid, either before or after the first solvent is removed from them. Various spraying and atomization techniques can be used to accomplish this. Devices such as nozzles and atomizers that are designed to form fine mists or sprays are suitable. Single-fluid nozzles can be used if desired. Nozzles of this type bring only a single fluid (the crude reaction solution) to the nozzle tip, where it is sprayed into the gaseous medium. Two-fluid nozzles are also useful, and are preferred in certain embodiments of the invention. In a two-fluid nozzle design, the crude reaction solution and a second fluid (typically a gas such as steam), are brought separately to the nozzle tip, where they are combined and sprayed. The second fluid provides energy that is used to disperse the crude reaction mixture into droplets and eject it from the nozzle. Suitable two-fluid nozzles are commercially available from sources such as Spraying Systems, Inc., Wheaton, Ill. USA. The size distribution of droplets produced by a two-fluid nozzle can be changed by changing the relative rates at which the atomizing gas (and any shroud gas as described below) and crude reaction solution are sprayed.

In some embodiments, essentially all of or part of the first solvent is volatilized from the sprayed droplets while the droplets are in the gaseous medium, before they make contact with the nonsolvent liquid. Alternatively, some or all of the first solvent can be volatilized from the droplets after they are dispersed into the nonsolvent liquid.

The first solvent is volatilized by bringing the droplets to at least the boiling temperature (at the particular pressure conditions used during this step) of the first solvent. If the first solvent forms an azeotrope with the nonsolvent liquid, the temperature in that case should be at least the temperature at which the azeotrope boils (again, at the particular pressure conditions employed). The temperature may be as high as the boiling temperature of the nonsolvent liquid at the particular pressure conditions that are used. To some extent, operating pressures can be adjusted to raise or lower the operating temperature that is needed to remove the first solvent. For example, running the process at subatmospheric pressures can allow a lower operating temperature to be used, as the solvent will have a lower boiling temperature at the lower operating pressure.

The needed heat can be supplied by heating the gaseous medium, by heating the starting solution prior to forming the droplets, or by heating the droplets. Alternatively or in addition, this can be done by heating the entire dispersion to the necessary temperature. If desired, the nonsolvent liquid can be brought to the necessary temperature before the starting solution is dispersed into it. Alternatively or in addition, the droplets can be dispersed first, and the entire dispersion then brought to the needed temperature. It is also possible to provide only localized heating at or near the location of the droplets in order to heat them to the needed temperature without heating the entire dispersion.

One way of heating the droplets to volatilize the first solvent is to use a hot gas to heat and atomize the crude reaction fluid. The hot gas is preferably used as a second fluid in a two-fluid nozzle as described before. If it is desired to evaporate more solvent from the droplets than the thermal energy of the atomizing gas can supply, additional hot gas can be supplied around the nozzle tip to from a shroud of additional hot gas. The hot shroud gas can be any gas which does not react with the brominated polybutadiene polymer, including air, nitrogen, argon, helium or steam. Steam is especially preferred.

A preferred way of heating the dispersion is to introduce a hot gas below the surface of the dispersion. The gas can be any gas which does not react with the organic polymer (and preferably not with the solvent or the nonsolvent liquid, either). The gas may be air, nitrogen, argon, helium or steam. Steam is especially preferred on the basis of its thermodynamic properties and cost, especially when the nonsolvent liquid is water. In addition to providing heat, the subsurface introduction of the hot gas provides additional energy for dispersing the starting solution into droplets and/or keeping the droplets dispersed.

In an especially efficient process, the nonsolvent liquid is held in an agitated vessel, and the starting solution and steam are both introduced below the surface of the nonsolvent liquid. The two fluids preferably are introduced simultaneously, and spatially close to each other. This permits the hot gas to supply energy for breaking the starting solution into droplets and provides for rapid heating of the droplets. Even more preferably, the two fluids are introduced not only simultaneously and spatially close to each other, but also at a high shear region of the vessel, such as near the tip of an agitator. Again, this arrangement favors rapid dispersal of the starting solution into droplets and efficient heating of the droplets.

Shear is applied to the droplets during the removal of the first solvent, in order to keep the droplets from coalescing into large masses as the solvent is removed. Some agglomeration of the droplets to form small agglomerated particles often occurs and can be tolerated provided that the agglomerated particles produced in this way are small enough to form a powder or finely granulated material.

As the first solvent is removed, the organic polymer will precipitate and particles will form. Preferably enough of the first solvent is removed such that the polymer particles contain no more than 5%, more preferably no more than 1% and even more preferably no more than 0.25% by weight of the first solvent. For purposes of this invention, "essentially all" of the first solvent is considered to have been removed if the polymer particles contain no more than 1% solvent by weight.

The volatilized first solvent is removed from the vessel containing the resulting slurry. Various gas-liquid separation techniques can be used to separate the volatilized solvent from the nonsolvent liquid, but the simplest approach is to provide a head space into which the solvent can pass, and from which it can be removed from the vessel. The head space is maintained at temperature and pressure conditions sufficient that the vaporized solvent does not condense and re-enter the liquid phase. In many cases, a portion of the nonsolvent liquid is vaporized at the same time as the solvent. The vaporized nonsolvent liquid aids in removal of residual solvent from the particles in the same manner as does the addition of a hot gas. In this embodiment, heat to vaporize the portion of the nonsolvent liquid may be applied internally (such as by introducing subsurface steam as described above,) or externally.

The first solvent that is removed in this manner can be recycled or otherwise reused. If necessary, the first solvent may undergo one or more purification steps before being recycled or reused. For example, the first solvent that is removed from the process will in most cases contain some amount of the nonsolvent liquid that is removed along with the first solvent. In most cases, it will be necessary or desirable to separate the first solvent from at least a part of such nonsolvent liquid. If the first solvent and the nonsolvent liquid are immiscible in each other and have different densities, this can be done by condensation of the vapor mixture followed by decantation or other methods by which immiscible liquids can be separated. Alternatively, distillation or other methods can be used to separate the first solvent from the nonsolvent liquid. The nonsolvent liquid that is separated in this manner can be discarded or recycled back into the solvent transfer process.

After the first solvent is removed in the foregoing manner, the organic polymer is dispersed in the form of particles in the nonsolvent liquid, forming a slurry. The solvent transfer is completed by contacting this slurry with the second solvent, under conditions such that the organic polymer becomes dissolved in the second solvent.

The second solvent is different than the first solvent, but of course must also be a solvent for the organic polymer. Materials as described with regard to the first solvent are in general also useful as the second solvent. The second solvent preferably is substantially immiscible with the nonsolvent liquid, i.e., under the operating conditions, the second solvent and the nonsolvent liquid preferably are soluble in each other to the extent of no more than about 5 parts, preferably no more than about 2 parts, of one per 100 parts of the other. The second solvent may be more volatile, less volatile, or of approximately equal volatility as the nonsolvent liquid.

In a process of particular interest, the organic polymer is a butadiene homopolymer or copolymer which is to be taken to a bromination process. Suitable solvents in such a bromination process are aprotic, and do not contain either hydrogen atoms bonded to a tertiary carbon atom or oxygen. Halogenated alkanes such as carbon tetrachloride, chloroform, dichloromethane, bromochloromethane, dibromomethane and 1,2-dichloroethane, cyclic alkanes that contain no hydrogen atoms bonded to a tertiary carbon atom and halogenated aromatic compounds bromobenzene, chlorobenzene and dichlorobenzene are particularly preferred solvents. Four especially preferred second solvents, when the organic polymer is a butadiene polymer or copolymer, are dichloromethane, dichloroethane, dibromomethane and bromochloromethane.

The conditions of contacting the slurry with the second solvent are such that the organic polymer dissolves in the second solvent, and the organic polymer is not significantly thermally degraded. Increasing temperatures and agitation both favor rapid dissolution of the organic polymer particles, and so both conditions are preferred. The temperature in general will not exceed the boiling temperature of the nonsolvent liquid or the second solvent, whichever is lower at the pressure conditions used at this step. Pressures can be superatmospheric, atmospheric or subatmospheric during this step, although subatmospheric pressures are generally not preferred. Superatmospheric pressures can be used if desired to allow the use of higher temperatures without boiling the liquids.

Because the slurry is hot when it is first produced, it is efficient to contact the second solvent with the slurry before the slurry has cooled. Additional heat can be supplied if necessary in any convenient fashion. If desired, the second solvent can be heated before mixing it with the slurry.

When it is necessary or desirable to avoid contaminating the first solvent with the second solvent, it is preferred to transfer the slurry from the vessel in which it was formed into a downstream vessel before contacting the slurry with the second solvent. The first solvent that was removed from the slurry before the transfer will in that way avoid all contact with the second solvent, and so will not become contaminated with the second solvent.

If the slurry contains some residual quantity of the first solvent, it may be necessary to remove that residual quantity before contacting it with the second solvent. This is the case when it is important not to contaminate the second solvent with the first solvent. The residual first solvent can be removed from the slurry by various devolatilization methods. If contamination of the second solvent with the first solvent can be tolerated, it is unnecessary to remove residual quantities of the first solvent before contacting the slurry with the second solvent.

The second solvent remains in contact with the slurry until the organic polymer has become dissolved in the second solvent to form a solution therein. This solution is then separated from the nonsolvent liquid to complete the solvent transfer.

The separation method will of course depend on the particular nonsolvent liquid and the second solvent. Preferably, the second solvent and the nonsolvent liquid are substantially immiscible in each other, and the organic polymer solution in the second solvent has a different density than the nonsolvent liquid. This permits the mixture to separate into phases, which can be easily separated by decantation or centrifugation methods. It is also possible to volatilize the nonsolvent liquid from the mixture, but this is less preferred because it is energy-intensive.

The nonsolvent liquid can be recovered and recycled into the process. If it is important to prevent contamination of the first solvent by the second solvent, the nonsolvent liquid can be cleaned in some appropriate manner to remove traces of the second solvent before being recycled into the process. However, if the nonsolvent liquid can be recycled farther downstream in a larger process of which the solvent exchange process is part, this is greatly preferred as then there is no possibility of contamination of the first solvent with traces of the second solvent.

An embodiment of the process is shown schematically in FIG. 1. Line 1 carries the starting solution of the organic polymer in the first solvent and delivers it to slurry vessel 3. Hot nonsolvent liquid is added through line 2. In the embodiment shown here, steam is injected into slurry vessel 3 through line 4, and is used to heat and atomize the starting solution supplied through line 1 to form droplets of the starting solution in the head space of slurry vessel 3. Slurry vessel 3 is agitated via agitator 5 or equivalent means. Additional heat can be supplied to slurry vessel 3 internal or externally, using means that are not shown.

The droplets formed in the head space of slurry vessel 3 fall into a nonsolvent liquid that is contained in slurry vessel 3. The solvent volatilizes from the droplets and is removed via line 6 from at or near the top of slurry vessel 3. Typically, some of the nonsolvent liquid is removed via line 6 together with the solvent. This mixture is scrubbed in optional scrubber 8 to remove any entrained polymer particles. The scrubber is heated externally or internally, through means not shown, to prevent condensation of the vapors from slurry vessel 3. Additional hot nonsolvent liquid is added to optional scrubber 8 through line 7 to transfer the solids captured by optional scrubber 8 back into slurry vessel 3 via lines 15a/15b. The bulk of the volatilized solvent is taken through line 9 to condenser 10, where the solvent is condensed. If the condensed solvent still contains significant quantities of the nonsolvent liquid, it can be transferred via line 11 to optional separator 12, where the first solvent and the nonsolvent liquid are further separated. Separator 12 can be, for example, a decanter, distillation column or other suitable separation device. The separated first solvent is then removed via line 13 for reuse, further clean-up and/or recycling. Nonsolvent liquid recovered in separator 12 can be recycled into slurry vessel 3. As shown, this is done via line 14 and line 15b.

The slurry that is formed in slurry vessel 3 is transferred through line 16 into dissolution vessel 17. Second solvent is introduced into dissolution vessel 17 via line 18. Dissolution vessel 17 is preferably agitated to provide good contact between the slurry particles and the second solvent. The slurry particles dissolve into the second solvent in dissolution vessel 17. In the embodiment shown, a mixture of the nonsolvent liquid and the organic polymer solution (in the second solvent) is removed from dissolution vessel 17 through line 19 and transferred to separation apparatus 20 where the nonsolvent liquid is separated from the polymer solution. Nonsolvent liquid is withdrawn via line 21 and the polymer solution is withdrawn via line 22. Nonsolvent liquid withdrawn via line 21 can be recycled into slurry vessel 3 (after suitable cleanup if necessary), discarded, or recycled into some downstream process. It is possible in some cases to affect this separation within dissolution vessel 17, in which case separation apparatus 20 becomes unnecessary and can be omitted.

In certain embodiments, the process of the invention is part of a larger process for brominating a butadiene polymer. The larger process comprises:

(a) forming droplets of a first solution of the butadiene polymer in a hydrocarbon solvent, (b) thermally stripping at least 95% of the hydrocarbon solvent from the droplets to form particles of the butadiene polymer and a hydrocarbon solvent stream, (c) before, during or after step (b), immersing said droplets or particles in a continuous aqueous liquid phase to form a slurry of the butadiene polymer in the continuous aqueous liquid phase;

(d) contacting said butadiene polymer slurry with a halogenated solvent to dissolve the butadiene polymer into the halogenated solvent and produce a second butadiene polymer solution;

(e) separating said second butadiene polymer solution from the aqueous liquid phase;

(f) contacting the second butadiene polymer solution with a brominating agent to produce a brominated butadiene polymer;

(g) recovering the brominated butadiene polymer from said halogenated solvent; and (h) recycling at least a portion of the halogenated solvent recovered in step (g) into step (d).

Figure 2:
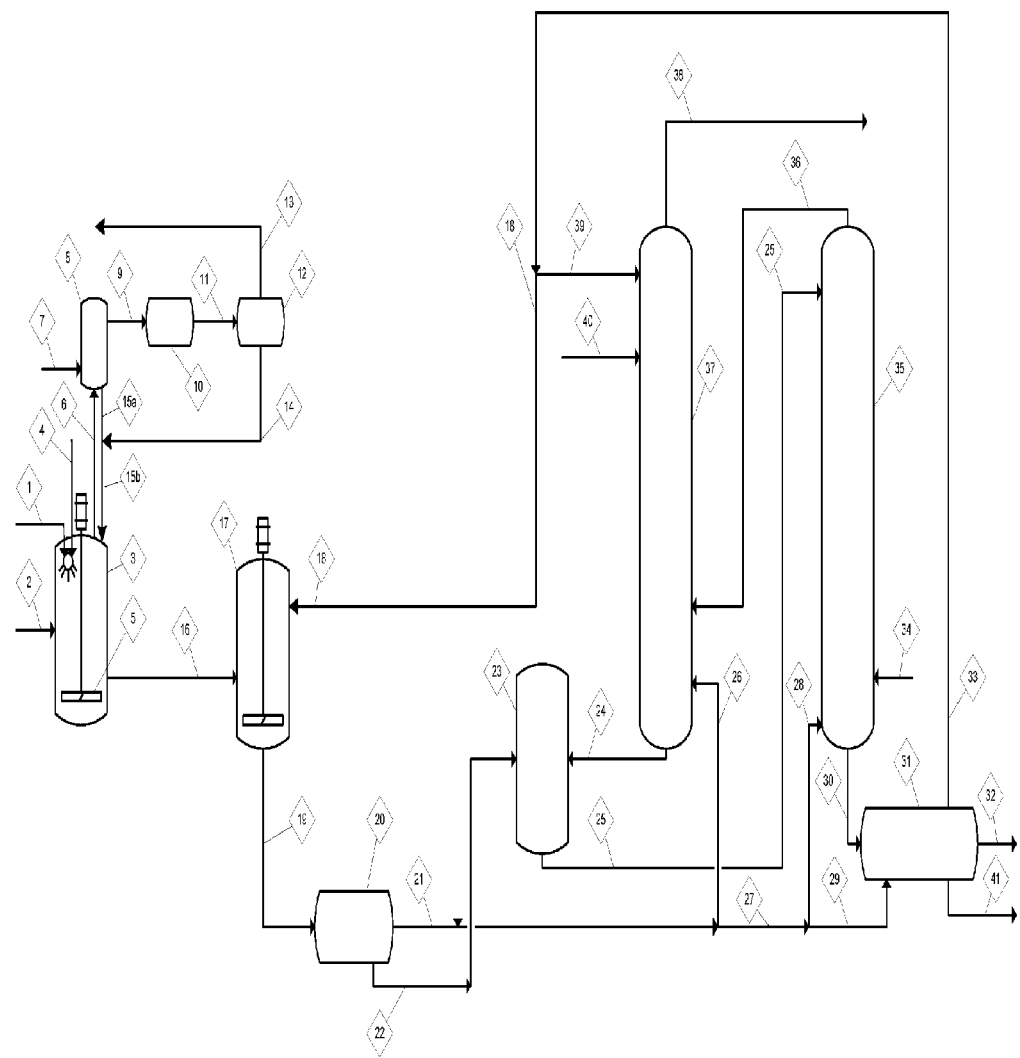
FIG. 2 is a schematic diagram illustrating a second embodiment of the invention.

FIG. 2 illustrates an embodiment in which the solvent transfer process is integrated with a bromination process. The organic polymer in this case is a butadiene homopolymer or copolymer, especially a styrene/butadiene block copolymer. The nonsolvent liquid is water. In FIG. 2, the equipment identified by reference numerals 1-22 is as described with respect to FIG. 1, and perform the same functions. In FIG. 2, the polymer solution withdrawn from separation apparatus 20 (or dissolution vessel 17, if the polymer solution is separated from the nonsolvent liquid there), is transferred through line 22 to reactor 23. A solution of a quaternary ammonium or phosphonium tribromide is introduced into reactor 23 through line 24. The butadiene polymer and the quaternary ammonium or phosphonium tribromide react in reactor 23 to produce a brominated butadiene polymer. Suitable conditions for the bromination reaction are described in WO 2008/021417.

The reaction that occurs in reactor 23 produces a mixture of brominated butadiene polymer, the second solvent and quaternary ammonium or phosphonium monobromide. The brominated butadiene polymer will be partially or entirely dissolved in the second solvent. The quaternary ammonium or phosphonium monobromide has little solubility in the second solvent, and so tends to precipitate from the reaction mixture, unless an aqueous phase is present. Therefore, the reaction mixture produced in reactor 23 is usually in the form of a slurry, with quaternary ammonium or phosphonium monobromide and perhaps some of the brominated butadiene polymer being suspended in the second solvent.

The reaction mixture is transferred to first extraction column 35 (as shown, via line 25). First extraction column 35 is most conveniently operated in a continuous manner. One or more holding tanks (not shown) can facilitate the transition from an upstream batch process to a continuous process starting at first extraction column 35.

The solution or slurry of the brominated butadiene polymer is extracted in first extraction column 35 with an aqueous phase that contains a reducing agent. In the embodiment shown, water is introduced into first extraction column 35 in two places. A solution of water and reducing agent is introduced via line 34. In addition, water withdrawn from separation apparatus 20 (or dissolution vessel 17, if the water is separated from the organic polymer solution there) is introduced into first extraction column 35 (as shown, via lines 21, 27 and 28). It is within the scope of the invention to combine reducing agent with the water in line 21, 27 and/or 28 and to introduce all of the water and reducing agent into first extraction vessel 35 in a single stream. Alternatively, all of the water and reducing agent can be introduced via line 34, in which case water obtained from separation vessel 20 is recycled to another point in the process.

As shown, first extraction vessel 35 is operated countercurrently. The arrangement illustrated assumes that the second solvent will be denser than the water. In such a case, the brominated butadiene polymer solution is introduced near the top of first extraction column 35 and travels downward through the column. Water and the reducing agent are introduced lower in first extraction column 35, and travel upward through the column.

Quaternary ammonium or phosphonium monobromides are transferred into the aqueous phase in first extraction column 35, and in that manner are removed from the solution or slurry of the brominated butadiene polymer. The reducing agent converts any residual quaternary ammonium or phosphonium tribromides, which are soluble in the second solvent, to the corresponding monobromide salts, which are less soluble in the second solvent but more soluble in the aqueous phase. This increases the efficiency of the extraction, ensuring high recovery of the valuable quaternary ammonium or phosphonium monobromide salt.

An aqueous quaternary ammonium or phosphonium monobromide solution is withdrawn from near the top of first extraction column 35 and transferred to second extraction column 37 (as shown, via line 36).

The aqueous quaternary ammonium or phosphonium monobromide solution is contacted with bromine and the second solvent in second extraction column 37. In the embodiment shown, second extraction column 37 is operated countercurrently, and again assumes that the second solvent is denser than water. Therefore, the quaternary ammonium or phosphonium monobromide solution (and additional recycle water, if any) is introduced near the bottom of second extraction column 37. As shown, bromine is added through line 40. The bromine can be added as a solution in the second solvent. Second solvent is added near the top of second extraction column 37, through line 39. In the embodiment shown, fresh second solvent is recycled from downstream in the process. Fresh second solvent contacts the aqueous raffinate before that solution leaves second extraction column 37. Traces of bromine entrained in the aqueous raffinate are thus extracted into the fresh recycle solvent. Similarly, additional wash water preferably is added to second extraction column 37 below the quaternary ammonium or phosphonium monobromide feed (as shown, via line 26). Water withdrawn from separation apparatus 20 (or dissolution vessel 17, if the water is separated from the organic polymer solution there) may be used as this wash water, or water withdrawn from recovery apparatus 31 through line 41 may be used. These separate water and solvent additions allow the monobromide, which partitions strongly into the aqueous phase, to be converted efficiently to the quaternary ammonium or phosphonium tribromide species, which in turn partitions strongly into the second solvent.

Therefore, a solution of the quaternary ammonium or phosphonium tribromide is formed in second extraction column 37. This solution is recycled back into reactor 23 (as shown, through line 24).

A washed solution or slurry of the brominated butadiene polymer in the second solvent is formed in first extraction column 35. The brominated butadiene polymer is recovered from that washed solution or slurry, to produce a solid brominated butadiene product and a solvent stream. All or a portion of the solvent stream can be recycled back into the process. It is preferred to recycle at least a portion of the solvent stream back into second extraction column 37 (as shown, via lines 33 and 39), back into dissolution vessel 17 (as shown, via lines 33 and 18), or both.

As shown in FIG. 2, the solution or slurry of the brominated butadiene polymer is withdrawn from first extraction column 35 through line 30, and transferred to recovery apparatus 31. The brominated butadiene polymer is separated from the second solvent in recovery apparatus 31, producing a brominated butadiene polymer stream 32 and a solvent stream 33. Recovery apparatus 31 may be composed of two or more unit operations.

Recovery apparatus 31 may include a water washing step. In that case, water for the washing step can be recycle water withdrawn from separation apparatus 20 through line 21. As shown, all or a portion of that water is transferred to recovery apparatus 31 through line 29. Water that is removed from recovery apparatus 31 may be recycled to various points in the process, including back into first extraction column 35, recovery apparatus 31, second extraction vessel 37 or into another aqueous stream in the process. It is preferred not to recycle water removed from recovery apparatus 31 into slurry vessel 3, as traces of second solvent that may exist in the recycle water would then contact the first solvent.

The Figures are intended only as a schematic representation of certain embodiments of the process. They include various preferred or optional features. The Figures are not intended to show specific engineering features or details, including the design of the various components shown. In addition, auxiliary equipment such as various valves, pumps, heating and cooling equipment, analytical and/or control devices and the like are not shown, but of course can be used as necessary or desirable.

The process may include features in addition to those described before or shown in the Figures. For example, the process may include means for taking various purge streams as a way to remove accumulating impurities from the process. Fresh reagent or solvent may be added to replenish the amounts purged from the system.

What is claimed is:

1. A process for transferring an organic polymer from a first solvent to a second solvent, comprising (1) forming droplets of a first solution of the organic polymer in a first solvent, (2) thermally stripping the first solvent from the droplets to form particles of the organic polymer, (3) before, during or after step (2), immersing said droplets or particles in a nonsolvent liquid to form a slurry of the organic polymer in the nonsolvent liquid, (4) after steps (2) and (3), contacting the slurry with the second solvent and dissolving the organic polymer in the second solvent to form a second solution, and (5) separating the second solution from the nonsolvent liquid.

2. The process of claim 1, wherein the nonsolvent liquid is water.

3. The process of claim 2, wherein step (2) is conducted by contacting the droplets with steam.

4. The process of claim 3, which is operated continuously.

5. The process of claim 4, wherein after step (3) the slurry is transferred to different equipment before the slurry is contacted with the second solvent.

6. A process for brominating a butadiene polymer, comprising
 (a) forming droplets of a first solution of the butadiene polymer in a hydrocarbon solvent,
 (b) thermally stripping at least 95% of the hydrocarbon solvent from the droplets to form particles of the butadiene polymer and a hydrocarbon solvent stream,
 (c) before, during or after step (b), immersing said droplets or particles in a continuous aqueous liquid phase to form a slurry of the butadiene polymer in the continuous aqueous liquid phase;
 (d) contacting said butadiene polymer slurry with a halogenated solvent to dissolve the butadiene polymer into the halogenated solvent and produce a second butadiene polymer solution;
 (e) separating said second butadiene polymer solution from the aqueous liquid phase;
 (f) contacting the second butadiene polymer solution with a brominating agent to produce a brominated butadiene polymer;
 (g) recovering the brominated butadiene polymer from said halogenated solvent; and
 (h) recycling at least a portion of the halogenated solvent recovered in step (g) into step (d).

* * * * *